United States Patent [19]
Gupta

[11] Patent Number: 4,887,278
[45] Date of Patent: Dec. 12, 1989

[54] EQUALIZER FOR DIGITAL TRANSMISSION SYSTEMS

[75] Inventor: Dev V. Gupta, Flemington, N.J.

[73] Assignee: Integrated Network Corporation, Bridgewater, N.J.

[21] Appl. No.: 100,241

[22] Filed: Sep. 23, 1987

Related U.S. Application Data

[63] Continuation of Ser. No. 891,462, Jul. 29, 1986, Pat. No. 4,745,622.

[51] Int. Cl.$^4$ .............................................. H04B 3/04
[52] U.S. Cl. ..................................... 375/7; 178/69 N; 370/24; 379/394; 357/12
[58] Field of Search ........................ 375/11, 12, 60, 7; 370/24, 25, 26; 178/69 R, 69 N; 379/340, 394, 398, 93, 97; 333/18, 17; 455/69

[56] References Cited

U.S. PATENT DOCUMENTS

| | | | |
|---|---|---|---|
| 2,034,703 | 3/1936 | Metzger | 370/24 |
| 2,236,225 | 3/1941 | Thunell et al. | 370/24 |
| 2,522,737 | 9/1950 | Bayard et al. | 178/69 N |
| 2,678,998 | 5/1954 | Young, Jr. | 455/69 |
| 3,151,295 | 9/1964 | Haviland | 455/69 |
| 3,568,100 | 3/1971 | Tarbox | 333/18 |
| 3,593,142 | 7/1971 | Freeny et al. | 375/12 |
| 3,824,501 | 7/1974 | Harris | 333/18 |
| 4,021,738 | 5/1977 | Gitlin et al. | 375/14 |
| 4,227,250 | 10/1980 | Wyner | 375/37 |
| 4,273,963 | 6/1981 | Seidel | 379/398 |
| 4,493,092 | 1/1985 | Adams | 375/36 |
| 4,507,793 | 3/1985 | Adams | 375/36 |
| 4,550,415 | 10/1985 | Debus, Jr., et al. | 375/14 |

FOREIGN PATENT DOCUMENTS

| | | |
|---|---|---|
| 0099566 | 2/1984 | European Pat. Off. |
| 2042784 | 3/1971 | Fed. Rep. of Germany |
| 60-84025(A) | 5/1985 | Japan |

*Primary Examiner*—Benedict V. Safourek
*Attorney, Agent, or Firm*—Hamilton, Brook, Smith & Reynolds

[57] ABSTRACT

A post-equalizer and pre-equalizer circuit for use in communicating between nodes in a pulse amplitude modulated digital communication system is described. The post-equalizer circuit comprises a first variable zero circuit, a second variable circuit, and a gain shaper circuit wherein the gain and frequency location of the zeros in the zero circuits combined with the gain of the gain shaping circuit are simultaneously controlled by a control circuit which generates a control voltage which is a monotonically increasing function of cable loss. The control voltage generates a signal equal to the difference between the equalized signal and the original transmitted signal which is used to vary the resistance of voltage variable resistors in the form of FET's in each of the zero circuits and gain shaper circuits. If the cable loss is above a predetermined value, a pre-equalizer circuit is switched into the transmit path of the communication system and provides a gain, zero and pole at predetermined frequencies which pre-compensates for the extra loss incurred in transmission over length greater than can be equalized by the post-equalizer. Additionally, a bi-quad ACE circuit is described which provides a hyperbolic relationship between the zero frequency location and circuit gain utilizing a cascode amplifier and emitter follower circuit with a feedback loop through a voltage variable resistor.

9 Claims, 4 Drawing Sheets

EQUALIZER FOR DIGITAL TRANSMISSION SYSTEMS

This application is a continuation of application Ser. No. 891,462, filed 7/29/86 now U.S. Pat. No. 4,745,622 issued May 17, 1988.

TECHNICAL FIELD

This invention is in the field of digital data or analog voice transmission systems and, more particularly, relates to apparatus and methods for equalizing or correcting for distortion caused by the frequency dependent transmission nature o cables used in such systems.

BACKGROUND ART

In Pulse Amplitude Modulated (PAM) digital transmission systems, digital pulses of substantially uniform amplitude and duration are transmitted between terminal facilities by way of regenerative repeaters spaced at intervals along the transmission medium. Each repeater first distinguishes between the presence or absence of a pulse and then regenerates each detected pulse with substantially its original amplitude and duration. Because of the frequency dependent nature of the transfer characteristics of the transmission media, such as a wire cable, it is necessary to provide equalization for the preceding section of cable at each repeater point.

Tarbox, in U.S. Pat. No. 3,568,100 issued Mar. 2, 1971, teaches that the transfer characteristic of a length of cable connecting adjacent regenerator repeaters in a digital transmission system can be approximated by the combination of flat loss and a single attenuation pole. The magnitude of the flat loss and the frequency of the pole are both dependent upon the length and the gauge of the cable. For a given gauge of cable, the flat loss increases with length and the frequency of the pole decreases. For a given length of cable, the flat loss increases and the frequency of the pole decreases as the cable gauge becomes finer.

In the Tarbox equalizer system, the peak signal level at the output of the equalizer is detected and the gain, i.e., amplitude response of the equalizer is varied along with the frequency location of a simple real zero of the equalizer's frequency response. The gain and zero location is varied in accordance with a complex non-linear relationship, which is a function of the detected peak voltage level. For very short cable lengths, i.e., below 10 db loss, the non-linear relationship given by Tarbox does not provide adequate compensation. Therefore, a manual switch must be provided for adjusting compensation parameters when the loss is less than 10 db.

A bi-quad automatic cable equalizer (Bi-Quad ACE) is U.S. Pat. No. 3,824,501 to Harris, issued July 16, 1974, wherein the "eye openings" of signals emanating out of transmission cables is maximized. Equalization is achieved by monitoring the equalizer's peak output signal, and adjusting the gain k, of the equalizer to maintain a constant output signal level, and by altering the frequency location of a simple real zero, g, in the equalizer's transfer response in accordance with the relation $1/k = K_1 g + K_2$, where $K_1$ and $K_2$ are equalizer constants.

The "eye opening" defines a decision region, within each transmission clock period, that is best suited for performing the signal regeneration task. A more thorough treatment of the "eye diagram" subject is found in the book entitled *Data Transmission*, by W. R. Bennett and J. R. Davey, p. 119, McGraw-Hill, 1965.

It was determined by C. Harris and W. Farmer, at Bell Telephone Laboratories, that good eye openings, i.e., greater than 70% over a length (l) of cable involving less than 34 db loss, could be achieved using an equalizer which compensated for a cable transfer function T(s) having a loss K(l) and a single pole P(l) with a hyberbolic relationship between K(l) and P(l).

SUMMARY OF THE INVENTION

Automatic equalizers of the Bi-Quad type described above in the Harris patent do not provide satisfactory compensation for very short (less than 10 db loss) or very long cables (over 34 db loss). As an example of loss related to specific cable length and gauge size, cables of #26 gauge and length 12,000 feet exhibit about 34 db loss.

A particular need exists for an automatic equalizer, of relatively simple circuit implementation, capable of compensating for cable transfer characteristics in cables of 26 gauge of over 13,000 feet, since a very large number of presently installed telephone cable lengths between central offices and subscribers exceed this length. In connecting these cables for use in 4 wire full duplex PAM signalling, it would be highly desirable to avoid the requirement of repeaters. The apparatus and method of the present invention provides satisfactory post equalization of the transfer characteristic of cables of up to 52 db loss (21K ft. of #26 gauge cable). This length is beyond the limit of non-loaded cable even for voice telephone applications.

In addition, the apparatus of the invention may be interfaced with standard Bi Quad ACE type equalizers at the receiving end of the circuit. To accomplish this, a pre-equalizer is provided in the transmit path, in accordance with the invention. The pre-equalizer shapes the spectrum of the transmitted signal at the transmitting end so that the receiving end perceives no more than 34 db of loss, even though the cable may actually have much more loss. With this pre-equalization circuit, the industry standard Bi-Quad ACE type equalizer is capable of properly interfacing with the apparatus of the present invention, even over an extended length of cable.

The post-equalizer of the invention, in general, comprises a first variable zero circuit, a second variable zero circuit, and a gain shaper circuit. The received signal is coupled to the input of the post-equalizer. The gain and the frequency location of the zeros in the zero circuits combined with the gain of the gain shaping circuit are simultaneously controlled by a control circuit which generates a control voltage $V_c$.

The control voltage circuit is responsive to the amplitude level of the post-equalized input signal and generates a control voltage $V_c$ equal to the difference between the amplitude of the equalized signal and the original transmitted signal. This voltage $V_c$ is used to vary the resistance of voltage variable resistors in each of the zero circuits and the gain shaper circuits.

In each of the real zero circuits, Field Effect Transistors (FET's) are located in the feedback path of amplifier inverter stages. The transfer characteristic T (s) of the zero circuits is adjusted by the FET's, such that the relationship between the gain (k) and the frequency location of the zero's (g) approximates a hyperbolic function for mid-length cable parameter, i.e., 10 to 30 db loss. For short cable lengths, the two simultaneous hyperbolic compensation functions are insufficient. Therefore, the gain shaper automatically reduces the overall gain for short cables, i.e., low loss signals, by utilizing $V_c$ to change the impedance of an FET coupled in series with an operational amplifier.

The post-equalizer circuit derives, from the received signal, a signal proportional to cable loss. If the cable loss is above a predetermined value, i.e., 34 db, the pre-equalizer circuit is switched into the transmit path and provides a fixed zero and fixed pole at predetermined frequencies and a fixed gain at a predetermined value for the transmit signal, thereby providing the excess gain versus frequency compensation needed to make the longest cable length seem to appear to be the equivalent of a cable having only 34 db loss.

BEST MODE OF CARRYING OUT THE INVENTION

Figure 1:
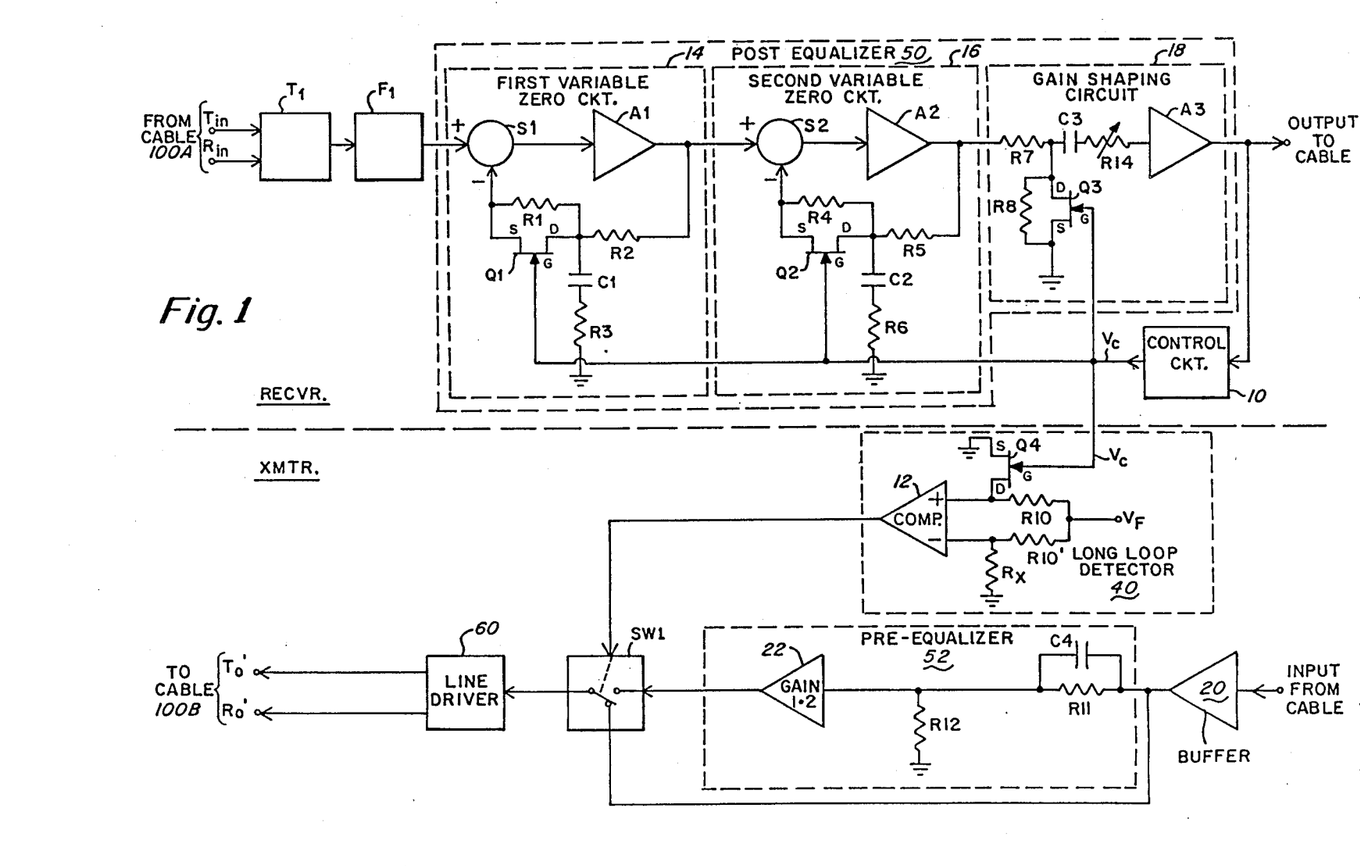
FIG. 1 is a block diagram and schematic of a first embodiment of the invention.

A transceiver, in accordance with the invention, will now be described, in detail, in connection with the partial block diagram of FIG. 1. FIG. 1 is divided by dotted lines into a receiver portion labelled RCVR and a transmitter portion labelled XTMR. Typically, the input signal across the tip and ring lines $T_{in}$ and $R_{in}$ comprises non-return-to-zero (NRZ) Alternate Mark Inversion (AMI) pulses which have been attenuated by the cable (not shown) and are coupled from the tip and ring lines of the cable to transformer $T_1$.

Transformer $T_1$ isolates the receiver from the harsh external environment of the cable, which may be subjected to power crossings, lightning or other types of electrical discharges. The filter $F_1$ provides two complex poles, in accordance with the transmission rules for shaping Nyquist pulses. Typically, this involves a Butterworth filter, which performs the pre-shaping function for the received signal before the signal is applied to the pre-equalizer circuit. The post-equalizer comprises a first variable zero circuit, shown in dotted lines 14, a second variable zero circuit 16, a gain shaping circuit 18 and a control circuit 10.

It should be noted that while the circuits 14, 16 and 18 are shown in a particular sequence, since these circuits are linear circuits, the order of the sequence is not critical.

The first variable zero circuit 14 produces a hyperbolic relationship between the circuit gain ($k_1$) and the frequency location of a first variable zero ($g_1$). The first variable zero circuit 14 comprises a summing node $S_1$ coupled to an amplifier inverter $A_1$. The output of the inverter is fed back to the summing node $S_1$ via a voltage controlled field effect transistor $Q_1$ and an R/C network comprising resistor $R_2$, capacitor $C_1$ and resistor $R_3$.

The FET $Q_1$ functions as a variable resistor $R_v$ which controls the gain $k_1$ of the amplifier $A_1$ in accordance with the following equation:

$$k_1 = \frac{R_2 + R_v}{R_1};$$

which can be rewritten as:

$$k_1 = R_2/R_1 [1 + R_v/R_2].$$

Let $\alpha$ be equal to $R_v/R_2$ then:

$$k_1 = R_2/R_1(1+\alpha);$$

The minimum gain of the circuit $k_{min}$ is $R_2/R_1$ since that would be the gain when $R_v=0$; then:

$$k_1 = k_{min}(1+\alpha) \qquad \text{Equation 1}$$

The frequency location $g_1$ of the first zero circuit is likewise determined by the setting of $R_v$, i.e., the voltage on FET $Q_1$, as follows:

$$g_1 = \frac{1}{2\pi \left(\frac{R_2 R_v}{R_2 + R_v}\right) C_1} \qquad \text{Equation 2}$$

The above assumes that stabilizing resistors $R_3$ has a relatively low impedance. The function of $R_3$ is to create a pole with capacitor $C_1$ which is equal to $\frac{1}{2} R_3 C_1$ and is outside of the bandwidth of the received signal. From the viewpoint of the signal; $R_s$ has no effect other than to keep the circuit stable so as to avoid parasitic oscillations.

The zero frequency location of Equation 2 can be similarly rewritten as in the gain Equation 1, as follows:

$$g_1 = \frac{1}{2\pi R_2 C_1} \left[\frac{R_v + R_2}{R_v}\right]; \qquad \text{Equation 3}$$

Since $g_{min} = \frac{1}{2\pi R_2 C_1}$ and $\alpha = R_v/R_2$ then:

$$g_1 = g_{min}[1 + 1/\alpha] \qquad \text{Equation 4}$$

By combining Equations 1 and 4 and eliminating therefrom, it can be shown that:

$$(k_1 - k_{min})(g_1 - g_{min}) = k_{min} \cdot g_{min} \qquad \text{Equation 5}$$

Figure 2:
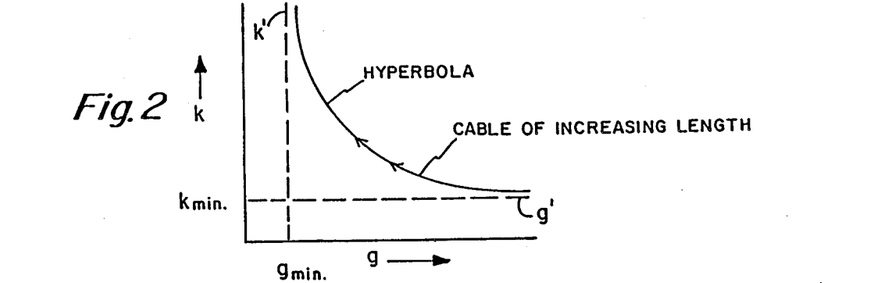
FIG. 2 is a plot of gain "k" versus zero location "g" for the first zero circuit.

A plot of gain $k_1$ versus zero frequency location $g_1$, in accordance with Equation 5, is shown in FIG. 2; from which it can be seen that Equation 5 reduces to the classic hyperbolic relationship wherein the product of two variables, $k'g'$, is equal to a constant, $k'_{min} \cdot g'_{min}$; wherein $k' = k_1 - k_{min}$ and $g' = g_1 - g_{min}$; and $k' \cdot g' = k_{min} \cdot g_{min}$.

The second zero circuit 16 is substantially identical to the first zero circuit and therefore need not be described herein except to point out that the particular location of the second zero frequency location $g_2$ is determined, as in the first zero circuit, by the particular circuit parameter values set forth in Table I below for a 56 kilobits/sec. transmission speed. These values were determined using analytical cable models simulated by a computer. Values for other data speeds can be calculated in the same fashion.

TABLE I

| Length (kft) | Loss at Nyquist Freq (db) | Gain | First Zero (Hz) | Second Zero (Hz) |
|---|---|---|---|---|
| 1 | 2.421 | 1.309 | 265258.48 | 358267.88 |
| 2 | 4.578 | 1.618 | 95578.05 | 428144.3 |
| 3 | 6.784 | 1.927 | 58144.04 | 176511.27 |
| 4 | 9.135 | 2.237 | 38707.24 | 148871.78 |
| 5 | 11.586 | 2.546 | 27527.44 | 163134.13 |
| 6 | 14.066 | 2.856 | 19655.44 | 2307746.67 |
| 7 | 16.538 | 3.2 | 15434.05 | 431309.74 |
| 8 | 18.992 | 3.474 | 12366.34 | 341068.88 |
| 9 | 21.437 | 3.784 | 9549.30 | 488605.52 |
| 10 | 23.879 | 4.094 | 7659.33 | 689140.74 |
| 11 | 26.322 | 4.403 | 6277.06 | 128557.22 |
| 12 | 28.767 | 4.713 | 5289.89 | 75300.41 |
| 13 | 31.213 | 5.069 | 4462.38 | 57341.58 |
| 14 | 33.660 | 5.330 | 3792.92 | 43957.54 |
| 15 | 36.106 | 5.640 | 3243.44 | 35858.35 |
| 16 | 38.552 | 5.955707 | 3013.18 | 25810.70 |
| 17 | 40.998 | 6.25376805 | 2669.50 | 21289.59 |
| 18 | 43.443 | 6.575 | 2221.84 | 19492.04 |
| 19 | 45.889 | 6.885 | 1915.07 | 17022.71 |
| 20 | 48.335 | 7.195 | 1645.77 | 14884.17 |

The gain shaper circuit 18 receives the output signal from second variable circuit 16 which is coupled to resistor $R_7$, capacitor $C_3$, variable resistor $R_{14}$ and inverter amplifier $A_3$. The gain of gain shaper circuit 18 is controlled by the impedance $R_{Q3}$ of FET $Q_3$. This, in turn, is controlled by the voltage $V_c$ from control circuit 10 on the gate electrode G of $Q_3$.

FET $Q_3$ is connected in parallel across resistor $R_8$ and connected between ground and the junction between input impedance $R_7$ and coupling capacitor $C_3$. When $Q_3$ has a low impedance reactive to $R_8$, the gain of the circuit 18 is reduced since more of the input signal is passed to ground through the low impedance path through $R_8$ and $R_{Q3}$ in parallel. The effect of this is to reduce the gain when the cable length l is relatively short. When the cable length is short, $V_c$ will be low and the low voltage on gate electrode G of $Q_3$ causes the impedance $R_{Q3}$ of FET $Q_3$ to be low.

Conversely, if the cable length is long, the voltage $V_c$ will be made high, the impedance $R_{Q3}$ will be much greater than $R_8$ and the gain G of the gain shaping circuit is maximized; since $R_8$ in parallel with $R_{Q3}$ will essentially equal $R_8$.

The overall transfer function $T_{ov}(s)$ of the three circuits, 15, 16 and 18, is the product of $T_{z1}(s)$, $T_{z2}(s)$ and G wherein $T_{z1}(s)$ and $T_{z2}(s)$ are the transfer functions of the first and second zero circuits, respectively, and G is the gain of the gain shaper circuit.

$T_{z1}(s)$ for a given cable length l is equal to $$k_1 \left[ 1 + \frac{\delta}{g_1(1)} \right]$$

and $T_{z2}(s)$ equals $$k_1 \left[ 1 + \frac{\delta}{g_2(1)} \right]$$

where $\alpha$ = the Laplace variable; and
where:
$(k_1 - k_{1min})(g_1 - g_{1min}) = k_{1min}g_{1min}$
and
$(k_2 - k_{2min})(g_1 - g_2\text{min}) = k_{2min}g_{2min}$;
from Equation 5.

Figure 5:
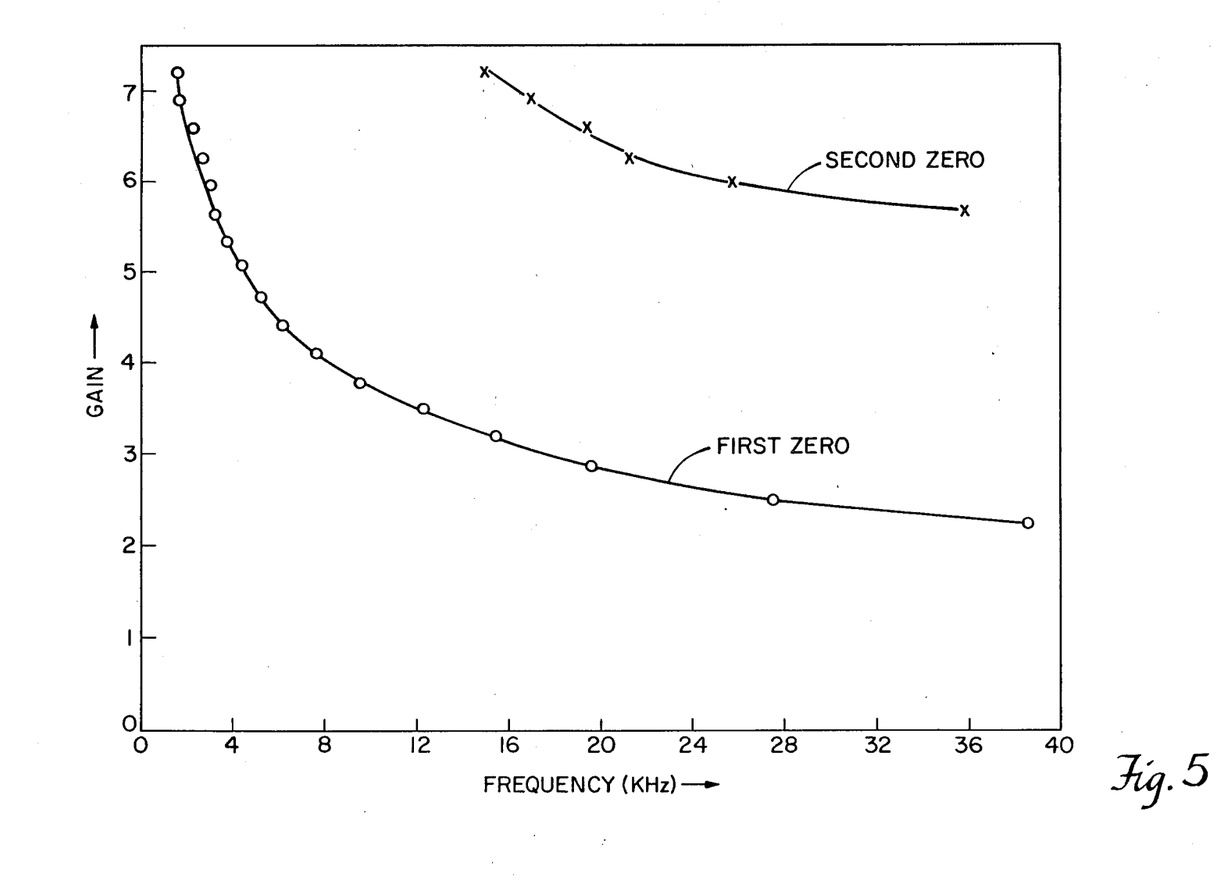
FIG. 5 is a gain versus zeroes plot for optimum equalization at 56 kilobits/sec. data speed.

Thus, the gain and zeroes move in a hyperbolic fashion. Also, note from Table I and FIG. 5, that the second zero $g_2$ does not significantly come into the signal energy band until the cable has become longer than 34 db. This is why a single zero hyperbolic equalizer can equalize cable up to 34 db loss fairly well.

The output signal from amplifier $A_3$ of circuit 18 is coupled to control circuit 10, which comprises a standard peak detector and integrator. Circuit 10 provides an output voltage $V_c$ proportional to the difference between the peak detected input signal level and the desired standard voltage transmit level, typically 1.5 volts peak. When the input signal to the control circuit 10 is at 1.5 volts the output voltage $V_c$ stabilizes at 1.5 volts. As the output voltage $V_c$ varies, then the impedance of the FET's $Q_1$, $Q_2$ and $Q_3$ likewise varies until equalization is achieved. The lower the voltage $V_c$ is, the lower the impedance of the FET's and vice versa.

The details of the XMTR portion of the transceiver of FIG. 1 will now be explained. The control voltage $V_c$ is coupled from central circuit 10 to the gate electrode of FET $Q_4$ in Long Loop Detector (LLD) circuit 40. The function of the LLD circuit 40 is to energize switch SW1, which connects pre-equalizer 52 into the transmit path, when the control voltage $V_c$ is sufficiently high as to indicate that the cable loss exceeds a predetermined value, i.e., 34 db. This, in turn, means that a cable of length/gauge in excess of 34 db loss, is coupled to the transceiver and that therefore pre-equalization is required in the transmit path in order to simulate a cable of less than 34 db loss, so that the equalization circuit of a receiver at the other end of the transmit path, which may only be capable of handling up to 34 db of signal loss, can accommodate the anticipated signal loss on the cable line.

The apparatus of LLD 40 comprises a pair of matched resistors $R_{10}$ and $R_{10}$, coupled at one end to a source of fixed DC potential $V_F$. The remaining end of $R_{10}$ is coupled to the plus input terminal of comparator 12 and the drain electrode of FET $Q_4$. The impedance $R_{Q4}$ of $Q_4$ is determined by $V_c$.

$R_{10}$ and $R_{Q4}$ thus form a voltage divider circuit providing one voltage signal to the plus terminal of voltage comparator 12. The negative input to comparator 12 is supplied by the voltage produced by the voltage divider circuit of $R_x$ and $R_{10}$, coupled to fixed voltage $V_F$.

Resistor $R_x$ is selected to have a fixed resistance equal to the resistance $R_{Q4}$ must assume for a 34 db loss cable. When $R_{Q4}$ exceeds $R_x$, the output of comparator 12 goes "High" energizing SW1 and connecting pre-equalizer 52 to Line Driver 60 in the transmit path. When $R_{Q4}$ is lower than $R_x$, indicating that a cable with a loss less than 34 db is connected to the transceiver, the output of comparator 12 is a "Low" and switch SW1 connects Line Driver 60 directly to Buffer 20 bypassing pre-equalizer 52.

Pre-equalizer 52 provides a transfer function characteristic having a fixed gain of G, a fixed pole at a frequency $f_p$ and a fixed zero at a frequency $f_z$.

The Gain G and the frequencies $f_p$ and $f_z$ can be computed in the following fashion. Using cable loss information, it is possible to determine the extra gain one must provide at different frequencies, so as to make the longest cable one must serve (transmit into) appear as a much shorter cable. More specifically, in the present case, a 43 db loss cable is made to appear as a 34 db loss cable. In practice, this excess gain versus frequency function can be satisfactorily simulated using a fixed gain, a fixed zero and a fixed pole. In the present example of a 43 db pre-equalizer, good values are: a gain of 1.2; a fixed zero at 8 khz and a fixed pole at 24 KHz.

Having determined the pre-equalization needed for the maximum length cable, it is sufficient to fix the pre-equalizer at that value, even though the cable being served, though longer than 34 db, is not as long as the maximum length cable. This is acceptable in practice because the marginal loss for a cable with loss above a value of 34 db becomes constant for the next kilofeet i.e. the excess gain versus frequency requirement for every extra kilofoot becomes the same. The effect is that if the pre-equalizer is designed for loss $L_{max}$, say equal to 43 db, and if the cable is only of loss L, say 38 db, the receiving post-equalizer will think the loss is $34-(L_{max}-L)=29$ db. The receiving post-equalizer will then set its variables to equalize a cable of loss 29 db.

In the circuit of FIG. 1, the fixed zero is determined by capacitor C4 and Resistor R11 connected in parallel to Buffer 20 and is located at a frequency $F_2$ equal to $\frac{1}{2}\pi C4$ ($R_{12} \uparrow \uparrow R_{11}$).

Figure 3A:
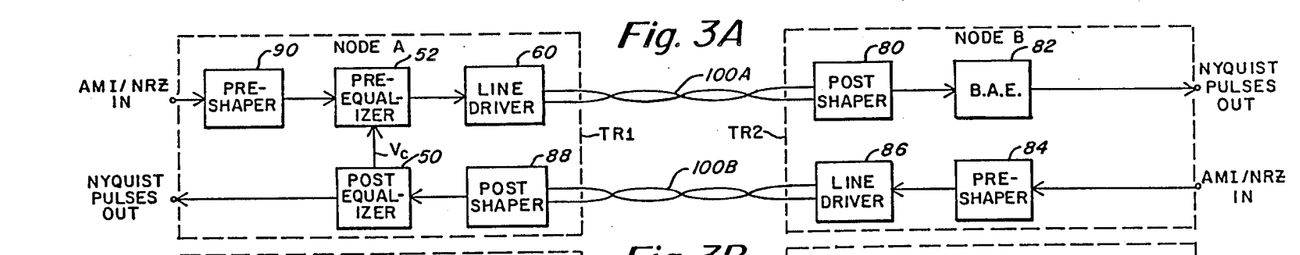
FIG. 3 is a block diagram of a first embodiment of a communication system.

This completes the description of the transceiver of FIG. 1. It may be helpful, now, to include a brief description of the setting in which the pre- and post-equalizers 52 and 50 are intended to function. FIG. 3a shows a 4-wire full duplex extended range access system, in accordance with the invention, capable of signalling between two transceivers TR1 and TR2 via 4-wire lines 100A and 100B having up to 43 db loss, equivalent to up to 18k feet of 26 gauge cable; and wherein one of the transceivers TR2 utilizes a standard BiQuad ACE equalizer 100 of the type described in U.S. Pat. No. 3,824,501 to Harris.

As may be seen in FIG. 3A, nodes A and B are in full duplex communication involving non-return to zero, (NRZ) signalling via four-wire communication lines wherein the transmit lines from node A to node B are the two wires labelled 100A and the receive lines for node A from node B are labelled 100B. The pulses are shaped to Nyquist pulses by conventional pre- and post-shapers, respectively labelled 90 and 88 in node A and 84 and 80 in node B. The function of the post-equalizer 50 is to compensate for the effect of the cable transfer function on the transmitted signal from the line driver 86 to the post shaper 88, which is primarily a deleterious frequency dispersion and signal loss effect.

The control voltage signal $V_c$ generated in the post-equalizer 50 is coupled to the pre-equalizer 52, as previously described, to either couple or uncoupled pre-equalizer 52, depending upon the gauge size and cable length of two-wire pair 100A, so that the transmitted signal can be accommodated by the standard biquad ACE equalizer 82. The $V_c$ signal is proportional to cable loss. If the cable loss is above a predetermined value, the pre-equalizer circuit 52 is switched into the transmit path of node A prior to the driver circuit 60 to provide a fixed zero and a fixed pole at a predetermined frequency and a fixed gain at a predetermined value which simulates the transfer characteristics of a cable having a cable loss less than or equal to a value which the BAE 82 is capable of accepting.

Figure 3B:
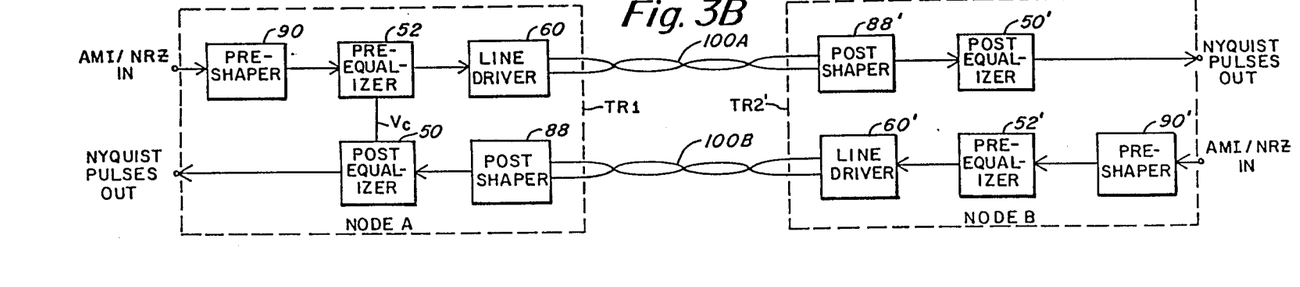
FIG. 3B is a block diagram of a second embodiment of a communication system.

In the apparatus of FIG. 3B, similar parts are similarly labelled. Again, node A and node B are in full duplex communication, wherein AMI/NRZ input pulses are transmitted from node A to cable 100A to node B and similarly, AMI/NRZ pulses inputted to pre-shaper 90' of node B are transmitted over two wires 100B to pulse shaper 88 at node A. The difference between FIGS. 3A and 3B is that in node B, a post-equalizer and pre-equalizer of the invention is included so that the apparatus of the invention is included in both nodes. This system is capable of ultra extended range access performance and will accommodate up to 52 db of cable loss equivalent to 21,000 feet of 26 gauge wire, even though the pre-equalizers are only set to 43 db maximum cable loss.

The variable zero circuits of the invention are suitable for independent usage as bi-quad ACE equalizers and will therefore be described in greater detail in connection with FIG. 4A. The circuit of FIG. 4A essentially achieves a simple hyperbolic relationship between the frequency location of the zero and the gain of the circuit. However, it does so using only three transistors in an AC amplifier configuration, whereas the circuit described in the Harris patent requires multiple operational amplifiers (each having a large number of transistors) to achieve the same function. The present circuit of FIG. 4A saves not only in circuit complexity, but more importantly, on power consumption of the circuit.

Figure 4A:
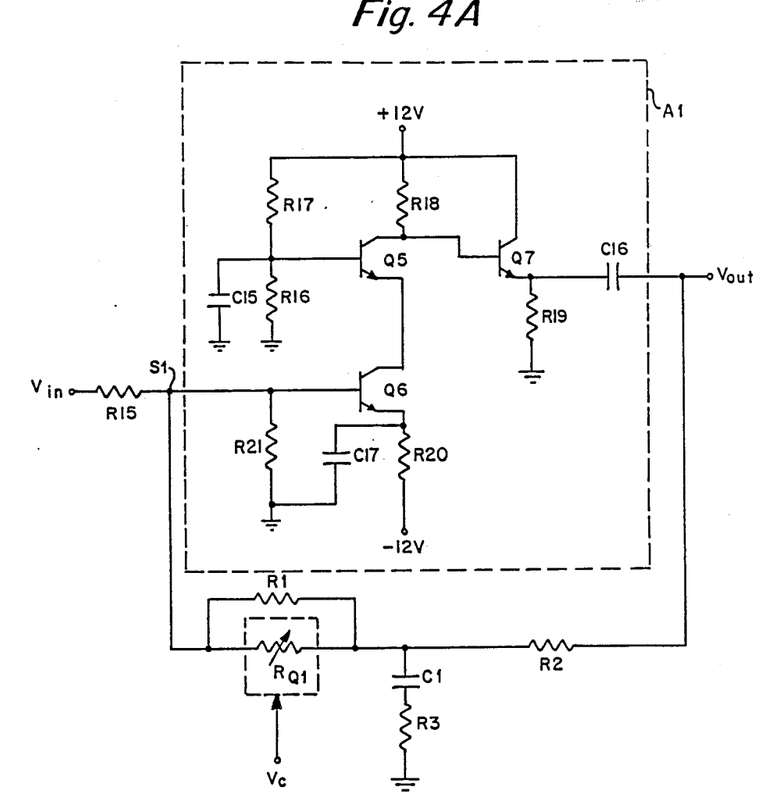
FIG. 4A is a schematic of a first real zero circuit in accordance with the invention.

In FIG. 4A, like items are labelled identical to items shown in the first variable zero circuit of post-equalizer 50 of FIG. 1. As may be seen in FIG. 4, the incoming voltage pulses from the cable have been pre-shaped by filter F1 of FIG. 1 and are inputted to input resistor $R_{15}$, which forms a summing node with resistor $R_1$ and variable resistance $R_{Q1}$ of FET $Q_1$ in parallel.

The output of the summing node $S_1$ is coupled to AC amplifier $A_1$, which comprises a pair of transistors $Q_5$ and $Q_6$ connected in cascode between +12 volts and -12 volts fed from respective biasing resistors $R_{18}$ and $R_{20}$. Resistors $R_{17}$, $R_{16}$ and $R_{17}$ and capacitor $C_{B2}$, as well as $R_{21}$ and capacitor $C_{17}$, provide appropriate biasing voltages to the cascode amplifier comprising transistors $Q_5$ and $Q_6$. Capacitor $C_{17}$ is chosen to be relatively very large, so that for frequencies in the bandwidth of the incoming signal $V_{in}$ capacitor $C_{17}$ is essentially a short to ground. Therefore, the pole produced by $R_{20}$ and capacitor $C_{17}$ is at a very low frequency relative to the energy content of the incoming signal $V_{in}$. This produces a very high gain amplification stage with essentially very little emitter resistance and a large collector resistance. The only thing limiting the gain is the intrinsic resistance of the emitter of transistor $Q_6$.

From an AC point of view, the gain of the cascode amplifier, $Q_5$ and $Q_6$, is the collector resistance divided by the emitter resistance. Since the collector resistance is essentially zero because of the high value of capacitor $C_{17}$, the gain of the cascode stage approaches infinity. The gain is bounded because of the emitter resistance intrinsic to transistor $Q_6$.

Transistor $Q_7$ is an emitter follower stage that buffers the output of $Q_5$ from the effects of the feedback circuit. Capacitor $C_{16}$ is a very large coupling capacitor which has a capacitance such that relative to $C_{B2}$, it presents a very low effective impedance in the bandwidth of the signal. The feedback path comprising $R_2$, $C_1$, $R_3$ transistor $Q_1$ and resistor $R_1$ have been previously described in connection with FIG. 1.

Figure 4B:
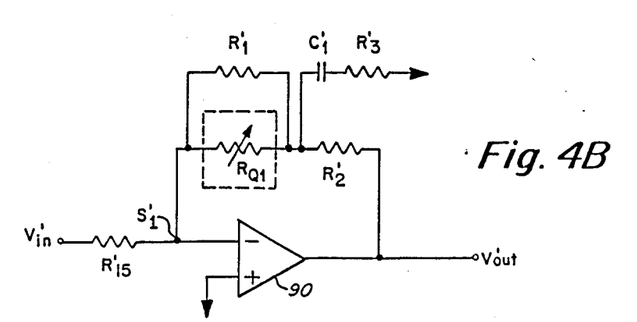
FIG. 4B is a schematic of an alternate embodiment of a real zero circuit in accordance with the invention.

FIG. 4B shows an alternate embodiment single OP-AMP realization of the hyperbolic gain/zero function. In FIG. 4B, parts identical to those in FIG. 4A carry identical labels with a prime suffix. Thus, the input voltage $V'_{in}$ is coupled to input resistor $R'_{15}$. $R'_1$ and $R_{Q1}$ are coupled in parallel to summing node $S'_1$ and $R'_{15}$ and the negative input terminal of a standard operational amplifier 90. The positive terminal of OP-AMP 90 is grounded, as shown. $C'_1$ and $R'_3$ are coupled in series between ground and $R'_2$ and $R'_1$, $R'_{Q1}$ in parallel. $R'_2$ is also connected to the juncture between $C'_1$ and $R'_1 \uparrow\uparrow R'_{Q1}$ in the feedback path from the output of OP-AMP 90 to summer $S'_1$. Using standard OP-AMP analysis and ignoring stabilizing resistor $R'_3$, it can be shown that the transfer function $T(s)$ from the input $V'_{in}$ to the output $V'_{out}$ is given by:

$$T(s) = k\left[\frac{s}{g} + 1\right]$$

where:

$$k = k_{min}[1 + \alpha]$$
$$g = g_{min}[1 + 1/\alpha]$$

and;

$$k_{min} \triangleq \frac{R'_2}{R'_{15}}$$

$$g_{min} \triangleq \frac{1}{2\pi R'_2 C'_1}$$

$$\text{and } \alpha \triangleq \frac{R'_{Q1} \uparrow\uparrow R'_1}{R'_2} \approx \frac{R'_{Q1}}{R'_2};$$

since $R'_1$ is very large. Noting the similarities to Equations 1 through 5, the hyperbolic nature of the circuit of FIG. 4B is illustrated.

Equivalents

This completes the description of the preferred embodiments of the invention. It is to be understood that these embodiments are illustrative of the principals of the invention and that modifications may be implemented by those skilled in the art without departing from the spirit and scope of this invention.

For example, while a 4-wire duplex transmission medium has been chosen to illustrate the embodiments of the invention, other transmission media, such as, two-wire, time shared communication, as for example, in time compression multiplex systems, may be employed. Also, other pulse modulation systems, may be employed in place of AMI/NRZ, provided the peak level is well controlled.

Furthermore, the automatic equalizer of the invention, while illustrated in the context of digital data signalling is applicable to voice frequency transmission in which the standard fixed peak sealing current may be substituted for the peak voltage amplitude of the data signal for estimating loop length.

I claim:
1. A transceiver for pulsed signalling communication over a four wire telephone line having a receiver with input terminals coupled across one pair of wires of said line for receiving pulsed signals transmitted to said receiver from said wires and a transmitter with output terminals coupled across the remaining pair of wires of said line to transmit pulsed signals from said transmitter over said wires;
   (a) said receiver comprising:
      (i) a transformer coupled to said input terminals to isolate the receiver from electrical discharges;
      (ii) a filter coupled to said transformer for preshaping received signals;
      (iii) a first variable zero circuit responsive to said preshaped pulses for modifying said pulses in accordance with the transfer function $T_{z1}(s)$ of said first variable zero circuit, which function produces a hyperbolic relationship between the gain of said first variable zero circuit and the frequency response of said first variable zero circuit to said pulses;
      (iv) a second variable zero circuit responsive to said modified pulses for further modifying said pulses in accordance with the transfer function $T_{z2}(s)$ of said second variable zero circuit, which functions produces a hyperbolic relationship between the gain of said second variable zero circuit and the frequency response of said second variable zero circuit to said pulses;
      (v) a gain shaper circuit responsive to the pulses modified in said first and second variable zero circuits for further modifying said pulses in accordance with the gain G of said gain shaper circuit;
      (vi) a control circuit for simultaneously varying $T_{z1}(s)$, $T_{z2}(s)$ and G in accordance with a control voltage Vc;
      (vii) a reference level voltage signal Vr;
      (viii) a peak voltage detector circuit for detecting the peak voltage level of said pulses modified by said gain shaper circuit and generating said control voltage Vc, which is proportional to the difference between said peak voltage level and vr.
2. The transceiver of claim 1 wherein:
   (b) said transmitter comprises:
      (i) a line driver coupled to the output terminals of said transmitter for generating said pulsed signals for transmission from said transmitter over said remaining pair of wires;
      (ii) a pre-equalizer circuit selectively coupled to said line driver through switch means; said pre-equalizer circuit providing a transfer function characteristic having a gain and frequency response for pulses to be transmitted by said line driver to provide extra gain at certain frequencies to said pulses;
      (iii) a long loop detector circuit coupled to said switch means and responsive to said control voltage $V_c$ for coupling said pre-equalizer to said line driver when Vc is sufficiently high as to indicate that the anticipated signal loss for the pulsed signals being transmitted over the remaining pair of wires from the transmitter exceeds a predetermined value.
3. The transceiver of claim 2 wherein the pulses signals are transmitted at a speed of 56 kilobits per second and the transfer functions $T_{z1}(s)$, $T_{z2}(s)$ have first and second zero frequency locations and the gain G is varied in accordance with cable length and loss, in accordance with the following table:

| Length (k ft) | Loss at Nyquist Freq (db) | Gain | First zero (Hz) | Second zero (Hz) |
|---|---|---|---|---|
| 1 | 2.421 | 1.309 | 265258.48 | 358267.88 |
| 2 | 4.578 | 1.618 | 95578.05 | 428144.3 |
| 3 | 6.784 | 1.927 | 58144.04 | 176511.27 |
| 4 | 9.135 | 2.237 | 38707.24 | 148871.78 |
| 5 | 11.586 | 2.546 | 27527.44 | 163134.13 |
| 6 | 14.066 | 2.856 | 19655.44 | 2307746.67 |
| 7 | 16.538 | 3.2 | 15434.05 | 431309.74 |
| 8 | 18.992 | 3.474 | 12366.34 | 341068.88 |
| 9 | 21.437 | 3.784 | 9549.30 | 488605.52 |
| 10 | 23.879 | 4.094 | 7659.33 | 689140.74 |
| 11 | 26.322 | 4.403 | 6277.06 | 128557.22 |
| 12 | 28.767 | 4.713 | 5289.89 | 75300.41 |
| 13 | 31.213 | 5.069 | 4462.38 | 57341.58 |
| 14 | 33.660 | 5.330 | 3792.92 | 43957.54 |
| 15 | 36.106 | 5.640 | 3243.44 | 35858.35 |
| 16 | 38.552 | 5.955707 | 3013.18 | 25810.70 |
| 17 | 40.998 | 6.25376805 | 2669.50 | 21289.59 |
| 18 | 43.443 | 6.575 | 2221.84 | 19492.04 |
| 19 | 45.889 | 6.885 | 1915.07 | 17022.71 |
| 20 | 48.335 | 7.195 | 1645.77 | 14884.17 |

4. The transceiver of claim 2 wherein the long loop detector circuit comprises:

(a) a voltage comparator having two input terminals and an output terminal for generating a high or low voltage signal at its output terminal depending on whether the voltage input to one of its input terminals exceeds or is less than the voltage input to its other input terminal; and (b) means responsive to the voltage $V_c$ for varying the relative amplitude of the voltages at said input terminals of said comparator.

5. In a communication node coupled to a four wire full duplex telephone pulse signal communication network having a two wire receive path for receiving transmitted signals proceeding in one direction and a two wire transmit path for transmitting received signals in the direction from which said transmitted signals came, wherein the signal loss in said receive path and transmit path may exceed a given value, the improvement comprising a pre-equalizer, and first means responsive to the received transmitted signals in the receive path for determining when the signal loss in said receive path exceeds said given value and second means responsive to said first means for coupling said pre-equalizer into said transmit path for providing added gain to the transmitter signals to make the transmit path appear to be much shorter than it is.

6. The improvement of claim 5 wherein the pre-equalizer provides a transfer function characteristic having a fixed added gain, a fixed zero, and a fixed pole.

7. The improvement of claim 6 wherein the signal loss exceeds 34 db, the gain is 1.2, the zero is at 8 KHz and the pole is at 24 KHz.

8. The improvement of claim 6 wherein the pre-equalizer comprises a parallel circuit comprising two components, a first resistor R1 in parallel with a capacitor C1; said parallel circuit being coupled to a gain amplifier with a second register R2 coupled on one side to ground and on another side between said gain amplifier and parallel circuit.

9. The improvement of claim 8 wherein the fixed zero is determined by the values of the parallel circuit components and is located at a frequency equal to ½ times the capacitance of C1 in farads times the resistance value in ohms of R1, R2 in parallel.

* * * * *

UNITED STATES PATENT AND TRADEMARK OFFICE
CERTIFICATE OF CORRECTION

PATENT NO. : 4,887,278
DATED : Dec. 12. 1989
INVENTOR(S) : Dev V. Gupta

It is certified that error appears in the above—identified patent and that said Letters Patent is hereby corrected as shown below:

Col. 10, line 27, delete "functions" and insert ---function---.

Col. 10, line 45, delete "vr" and insert ---Vr---.

Col. 10, line 61, delete "$V_c$" and insert ---Vc---.

Col. 10, line 67, delete "pulses" and insert ---pulsed---.

Col. 12, line 1, delete "$V_c$" and insert ---Vc---.

Col. 12, line 30, delete "register" and insert ---resistor---.

Signed and Sealed this

Eighteenth Day of December, 1990

Attest:

HARRY F. MANBECK, JR.

Attesting Officer                Commissioner of Patents and Trademarks